(12) United States Patent
Tan et al.

(10) Patent No.: US 6,687,065 B2
(45) Date of Patent: Feb. 3, 2004

(54) RESONANCE SCREEN WITH VARYING FREQUENCY AND CONTROLLABLE GAIN BOOSTER

(75) Inventors: LeeLing Tan, Singapore (SG); MingZhong Ding, Singapore (SG); WeeMeng Yio, Singapore (SG); KianKeong Ooi, Singapore (SG); KokHoe Chia, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 344 days.

(21) Appl. No.: 09/778,472

(22) Filed: Feb. 7, 2001

(65) Prior Publication Data

US 2001/0028519 A1 Oct. 11, 2001

Related U.S. Application Data

(60) Provisional application No. 60/180,748, filed on Feb. 7, 2000.

(51) Int. Cl.[7] .......................... G11B 27/36; G11B 21/02
(52) U.S. Cl. ...................... 360/31; 360/75; 318/560
(58) Field of Search ........................ 360/31, 69, 75; 318/560

(56) References Cited

U.S. PATENT DOCUMENTS

| 5,155,422 | A | * | 10/1992 | Sidman et al. ............ 318/560 |
|---|---|---|---|---|
| 5,979,249 | A | * | 11/1999 | Koo et al. ............ 73/862.541 |
| 6,078,453 | A | * | 6/2000 | Dziallo et al. ............ 360/55 |
| 6,142,789 | A | | 11/2000 | Nolan et al. ............ 439/66 |
| 6,188,191 | B1 | * | 2/2001 | Frees et al. ............ 318/560 |
| 6,219,196 | B1 | * | 4/2001 | Semba et al. ............ 360/75 |
| 6,246,536 | B1 | * | 6/2001 | Galloway ............ 360/78.04 |

* cited by examiner

Primary Examiner—David Hudspeth
Assistant Examiner—Dan I. Davidson
(74) Attorney, Agent, or Firm—Mitchell K. McCarthy

(57) ABSTRACT

A disc drive includes a base and a disc rotatably attached to the base. The disc drive also includes an actuator assembly rotatably attached to said base and a device for moving the actuator assembly. The actuator assembly includes an actuator arm and a transducer head in a transducing relationship with respect to the disc. The transducer is attached to the actuator arm. A method for screening disc drives for resonant frequencies associated with the actuator arm includes the steps of following a track within the disc drive, and selectively boosting the servo control signal. The method further includes a step of monitoring a position error signal from a transducer attached to an actuator arm of a disc drive. The position error signal is monitored by filtering the position error signal using a bandpass filter. Boosting the servo control loop includes tuning the magnitude of the booster signal gain.

12 Claims, 7 Drawing Sheets

RESONANCE SCREEN WITH VARYING FREQUENCY AND CONTROLLABLE GAIN BOOSTER

RELATED APPLICATION

This application claims the benefit of U.S. Provisional Application Serial No. 60/180,748, filed Feb. 7, 2000 under 35 U.S.C. 119(e).

FIELD OF THE INVENTION

The present invention relates to the field of mass storage devices. More particularly, this invention relates to a method of screening disc drives for various frequencies of resonance.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer head to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer head is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of disc drive. Servo feedback information is used to accurately locate the transducer head. The actuator assembly is moved to the required position and held very accurately during a read or write operation using the servo information.

The actuator is rotatably attached to a shaft via a bearing cartridge which generally includes one or more sets of ball bearings. The shaft is attached to the base and may be attached to the top cover of the disc drive. A yoke is attached to the actuator. The voice coil is attached to the yoke at one end of the rotary actuator. The voice coil is part of a voice coil motor which is used to rotate the actuator and the attached transducer or transducers. A permanent magnet is attached to the base and cover of the disc drive. The voice coil motor which drives the rotary actuator comprises the voice coil and the permanent magnet. The voice coil is attached to the rotary actuator and the permanent magnet is fixed on the base. A yoke is generally used to attach the permanent magnet to the base and to direct the flux of the permanent magnet. Since the voice coil sandwiched between the magnet and yoke assembly is subjected to magnetic fields, electricity can be applied to the voice coil to drive it so as to position the transducers at a target track.

Two of the ever constant goals of disc drive designers is to increase the data storage capacity of the disc drive and to decrease the amount of time needed to access data. Decreasing the amount of time needed to access data can also be thought of as increasing the speed at which data can be retrieved. Increasing the speed at which data can be retrieved is very desirable in a disc drive. The decrease in access time increases the speed at which a computer system can perform operations on data. When a computer is commanded to perform an operation on data or information that needs to be retrieved, the time necessary to retrieve the data from the disc is generally the bottleneck in the operation. When data is accessed more quickly, more transactions can generally be handled by a computer in a particular unit of time.

In order to achieve a faster servo response, the gain of the servo system is very often raised. It will have an impact of raising the mechanical structural resonance peak at high frequency and the drive will be more susceptible to resonance. It is important to minimize resonance in order to improve disc drive's through-put performance. If the actuator arm does not resonate at frequencies associated with the normal operation of the drive, track following will also be improved. Track following is the ability of the disc drive and the servo system to keep the transducer for reading and writing positioned over a desired track. If resonances in the actuator arm are eliminated or minimized, track following is more achievable since the servo system will not be attempting to counter the effects of a resonating arm swinging across a desired track from an off track position on one side to an off track position on the other side of the track.

In order to track follow in a disc drive with increased TPI, the servo open loop bandwidth of the system must also be pushed or increased. This also increases the actuator's susceptibility to vibration induced at the actuator's resonant frequency, which may result in greater off-track disturbances of the read/write transducer. The situation becomes worse as mechanical structural damping and stiffness (resonant frequency) vary with temperature. At warmer temperatures such as the operating temperature of the disc drive, the amplitude of the resonant frequency may be raised. This will result in less gain margin of the servo loop.

A common approach to address the mechanical resonance problem is to include notch filters that attenuate the resonant modes at particular frequencies. A notch filter can be implemented in an analog hardware circuit notch or software notch. In either case, there are several problems associated with notch filters. Among the problems are that due to the different behavior of mechanical structural response at different temperature, the amplitude or even the frequency of resonant modes may change. Therefore, it is possible that one disc drive having acceptable margin at normal temperature may fail at a higher temperature. Furthermore, if the notch filter is implemented in an analog fashion, the thermal effects on the components will vary the center frequency of notch filter. Although the center frequency drifting problem does not exist for a digital notch filter, implementing a software digital notch will take up CPU time and affects the disc drive's performance. This is a major concern in disc drives manufactured for desktop operations where there is emphasis on low cost. Yet another problem is that the introduction of a notch filter also will introduce phase margin loss. As a result, there will not be many notch filters for every potential resonant mode.

During manufacturing, disc drives found to have resonance in the actuator arms are rejected. Disc drives having resonance at certain frequencies are considered as having a fatal error and are scrapped. One problem is that current screening processes are slow and consume computer time. Generally, screening includes analyzing the position error signal using digital fourier transform (DFT) to analyze the frequency components of the position error signal. This requires computer time and may slow down the testing portion of the manufacturing process.

What is needed is a method and apparatus to quickly screen disc drives for various frequencies, including frequency around a calculated frequency. There is also a need for a screening test that will determine resonant frequencies for different situations, such as when a disc drive is at an operating temperature or when the mechanical components cause a shift in the frequency. There is also a need for screening test which is quick and which can be easily incorporated into the current manufacturing and testing process. There is still a further need for a screening test that will indicate the amount of gain margin for the resonance.

SUMMARY OF THE INVENTION

A disc drive includes a base and a disc rotatably attached to the base. The disc drive also includes an actuator assembly rotatably attached to said base and a device for moving the actuator assembly. The actuator assembly includes an actuator arm and a transducer head in a transducing relationship with respect to the disc. The transducer is attached to the actuator arm. A method for screening disc drives for resonant frequencies associated with the actuator arm includes the steps of following a track within the disc drive, and selectively boosting the servo control signal. The method further includes a step of monitoring a position error signal from a transducer attached to an actuator arm of a disc drive. The position error signal is monitored by filtering the position error signal using a bandpass filter. Boosting the servo control loop includes tuning the magnitude of the booster signal gain.

In one embodiment, the magnitude of the booster gain is tuned to approximately 5 dB. Monitoring includes inputting the position error signal to a bandpass filter, and checking the output of the bandpass filter for indications of frequency resonance having a value within a selected range of frequency values. The selected range of frequency values is near a calculated value for resonant frequency associated with the actuator assembly. The selected range of frequency values may also include shifts from the calculated value for resonant frequency corresponding to a shift in the resonant frequency of the actuator assembly due to thermal effects. The selected range of frequency values may also include shifts from the calculated value for resonant frequency corresponding to a shift in the resonant frequency of the actuator assembly due to mechanical differences in the parts making up the actuator arm assembly of the disc drive. If resonant frequencies are found within the selected range, the disc drive is rejected.

A disc drive device includes a base, a disc rotatably attached to the base, an actuator arm for carrying a transducer head in a transducing relation with respect to the disc, and a disc drive controller, coupled to the actuator arm. The disc drive controller further includes a servo controller, coupled to the actuator arm. The servo controller monitors a position error signal in order to follow a track on the disc drive. A band pass filter is used to monitor the position error signal for resonant frequencies in the actuator arm. The bandpass filter monitors the position error signal for resonant frequencies within a selected range of resonant frequencies. The disc drive further includes a position error signal switch associated with the position error signal. The position error signal switch is for inputting the position error signal to the bandpass filter. The disc drive device also includes a booster signal generator which can be added to the servo control signal. A switch which can be enabled to add the booster signal to the servo control signal. The switch can also be termed a booster signal. In one embodiment, the booster signal switch and the position error signal switch add the booster signal and the bandpass filter to the servo control loop.

Most generally, an apparatus for testing a disc drive includes a servo control loop a device for altering the control signal and monitoring the feedback signal of the servo control loop. Alternatively, a disc drive includes a base, an actuator arm rotatably attached to the base, at least one disc rotatably attached to the base, where the actuator arm carries a transducer head in a transducing relation with respect to the disc, and a device for screening the disc drive for selected resonant frequencies.

Advantageously, the inventive method and apparatus quickly screens disc drives for various frequencies, including frequency around a calculated frequency. The method and apparatus will also determine resonant frequencies for different situations, such as when a disc drive is at an operating temperature or when the mechanical components cause a shift in the frequency. The screening test indicates the amount of gain margin for the resonance frequencies found. The method and apparatus is quick and can be easily incorporated into the current manufacturing and testing process.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
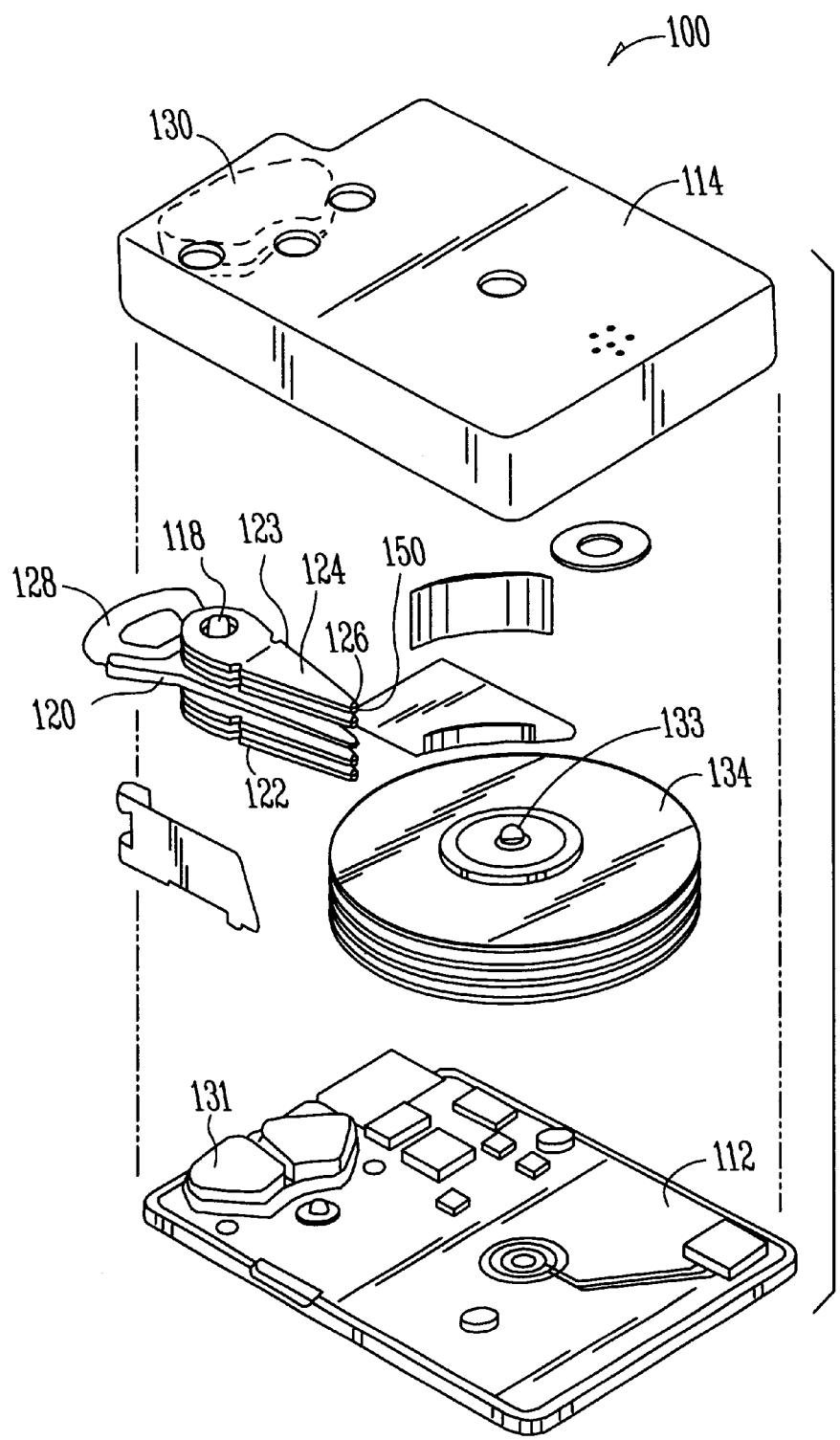
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 131 and a second magnet 130. As shown in FIG. 1, the second magnet 130 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
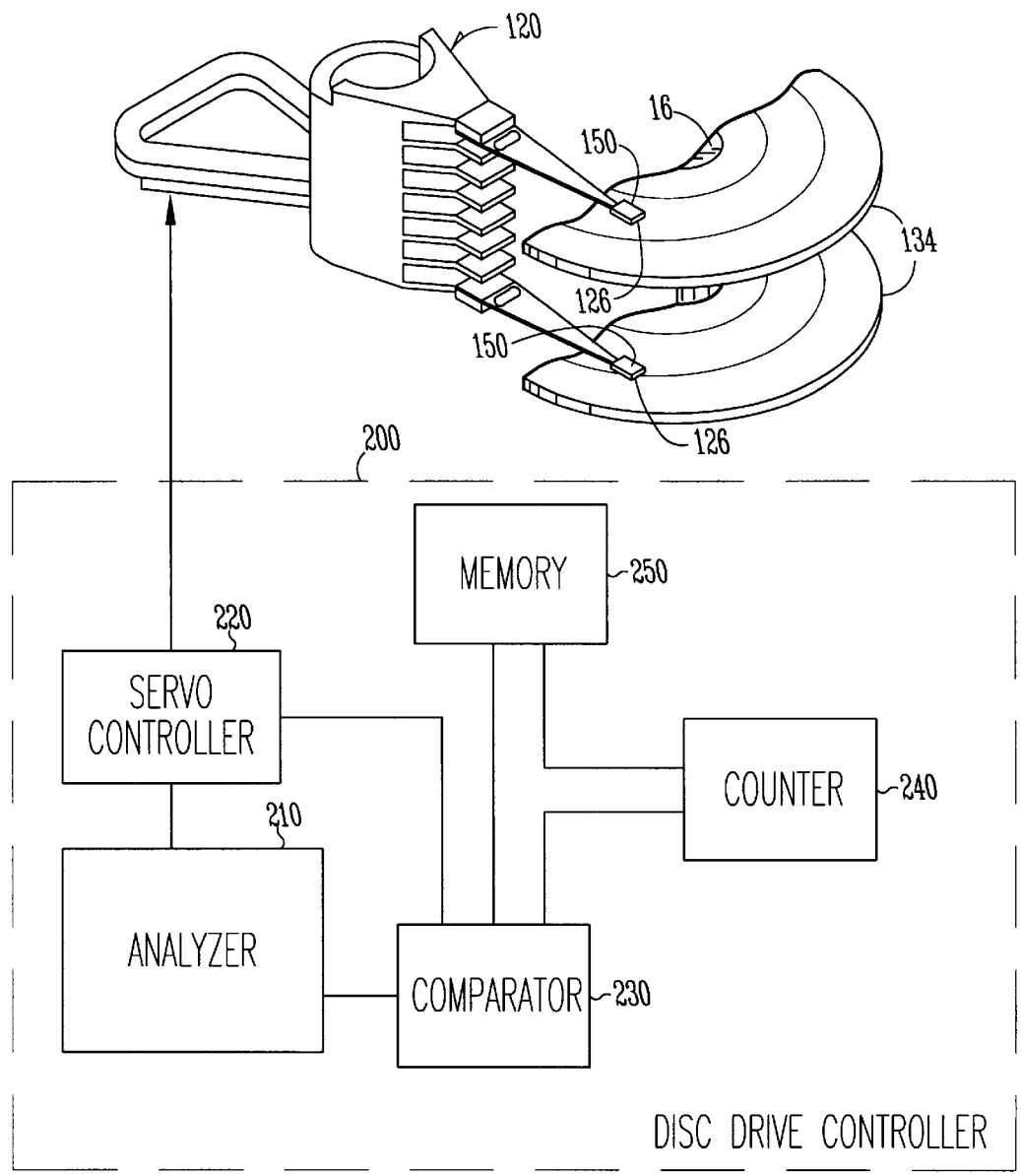
FIG. 2 is a schematic representation of a disc drive including portions of the disc drive controller used in servo control of the disc drive.

FIG. 2 is a schematic representation of a disc drive 100 and further includes selected portions of a disc drive controller 200 used in adjusting the seek profile parameters of the disc drive 100. As shown in FIG. 2, the disc drive 100 incudes at least one disc 134 rotatably attached to the base through a shaft 16. The disc drive 100 also includes an actuator 120 having a transducer head 126 and a transducer 150 for reading and writing to the disc 134. The actuator 120 carrying the transducer 126 in a transducing relation with respect to the disc 134. A disc drive controller 200 is coupled to the actuator 120, includes a servo controller 220.

Figure 3:
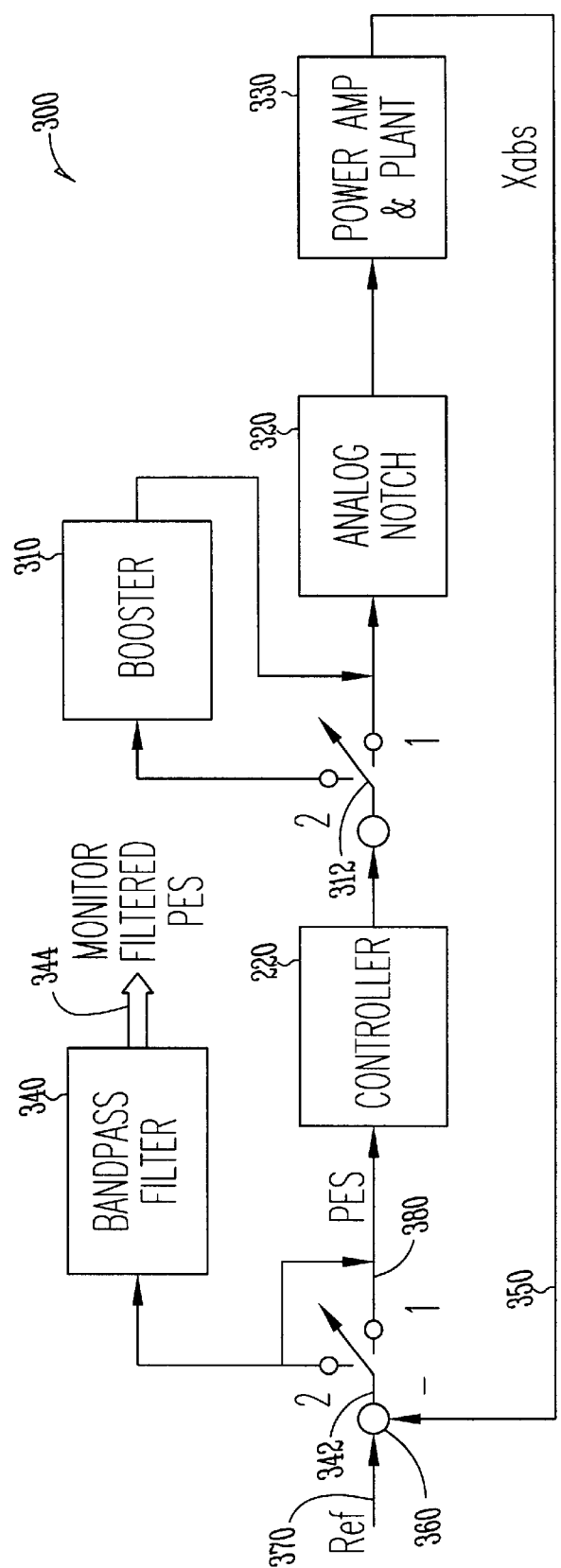
FIG. 3 is a schematic representation of the disc drive servo track following loop which can be switched between an operating mode and a screening mode.

The servo controller 220 also is part of a servo control loop 300 which is shown in FIG. 3. The servo control loop includes the controller 220, a booster for selectively boosting selected frequencies at selected times or during a test to find resonant frequencies within the drive. The servo control loop 300 also includes a servo booster switch 312. The servo booster switch 312 is used to control when the booster 310 is part of the servo control loop 300. For example, when the servo booster switch 312 is in a first position, the booster 310 is removed from the servo control loop 300. When the servo booster switch 312 is in position no. 2, the servo booster 310 is placed in the servo control loop 300. The servo control loop 300 also includes an analog notch filter 320 and a power amp and plant 330. A bandpass filter 340 and a bandpass filter switch 342 are included. The bandpass filter switch 342 is used to place the bandpass filter 340 to filter the monitored position error signal. For instance, when the bandpass filter switch 342 is in position 1, the bandpass filter 340 is being excluded from the monitored position error signal. When the bandpass filter switch 342 is in position no. 2, the bandpass filter 340 will be used to filter the PES signal. The bandpass filter 340 and the bandpass filter switch 342 are used to monitor the position error signal. The servo control loop 300 produces a position signal which is carried as signal 350 to a comparator 360. At comparator 360, a reference signal 370 is compared to the actual position signal 350. The difference between reference signal 370 and the actual position signal 350 is the position error signal 380 which is fed back to the controller 220 so that the controller may control the position of the sliders 126 and transducers 150 with respect to a selected track on the disc 134 (not shown in FIG. 3, but shown in FIG. 2). During normal operation, the control loop 300 will not include the booster 310 or the bandpass filter 340. Therefore, both the booster switch 312 and the bandpass filter switch 342 will be in position 1. At position 1, the servo control loop will operate as described above.

During initial testing, it is desirable to screen the disc drive 100 for resonance at various frequencies. Generally, designers and manufacturers will know approximately the frequencies at which a particular model of disc drive will resonant. Generally, the portion of the disc drive 100 that resonates is the actuator arms 123 and the attached slider 126 which carries the transducer 150. Sometimes the actual resonant frequency at which the disc drive 100 resonates is slightly different. For example, different mechanical parts can be placed together to form a system which resonates at a slightly different frequency than the known resonance point. In addition, as a disc drive moves from a starting temperature to an operating temperature, the resonant frequencies may also shift slightly. If looking for a single frequency during an initial test of the disc drive 100, there are certain disc drives that may pass the test that should have failed, since the resonance frequency at which a particular disc drive resonates at is slightly different than the known resonance point.

The booster 310 and the bandpass filter 340 are used to form a quick test to screen a disc drive 100 for a range of different frequencies. During the certification test, the booster switch 312 will switch to point 2, to include the booster 310 in the servo control loop 300. Once the booster 310 is included in the servo control loop 300, the position error signal (PES) 380 will be monitored. The bandpass filter 340 will be centered at the same frequency as the frequency included introduced by the booster 310. One revolution of PES data is collected and passed through the bandpass filter 340. The output of the bandpass filter, which is the monitor filtered PES signal 344, is checked. If a particular disc drive 100 has less margin at the particular resonant frequency introduced by the booster 310 and monitored by the bandpass filter 340, the disc drive will become unstable and start to vibrate at the resonant frequency after the booster 310 is included in the servo control loop 300. If this is the case, the output or monitor filtered PES signal 344, will have a high amplitude. For accuracy, four revolutions of PES will be collected and the bandpass filter outputs or monitor filtered PES 344 will be averaged. The result is compared with a certain threshold to determine whether to pass or fail the particular disc drive 100. Boosters at different frequencies are implemented in firmware associated with the disc drive controller 220. In other words, several different frequencies can be implemented in firmware and this test can be repeated for various frequencies to determine whether to pass or fail a disc drive for excessive resonance.

Figure 4:
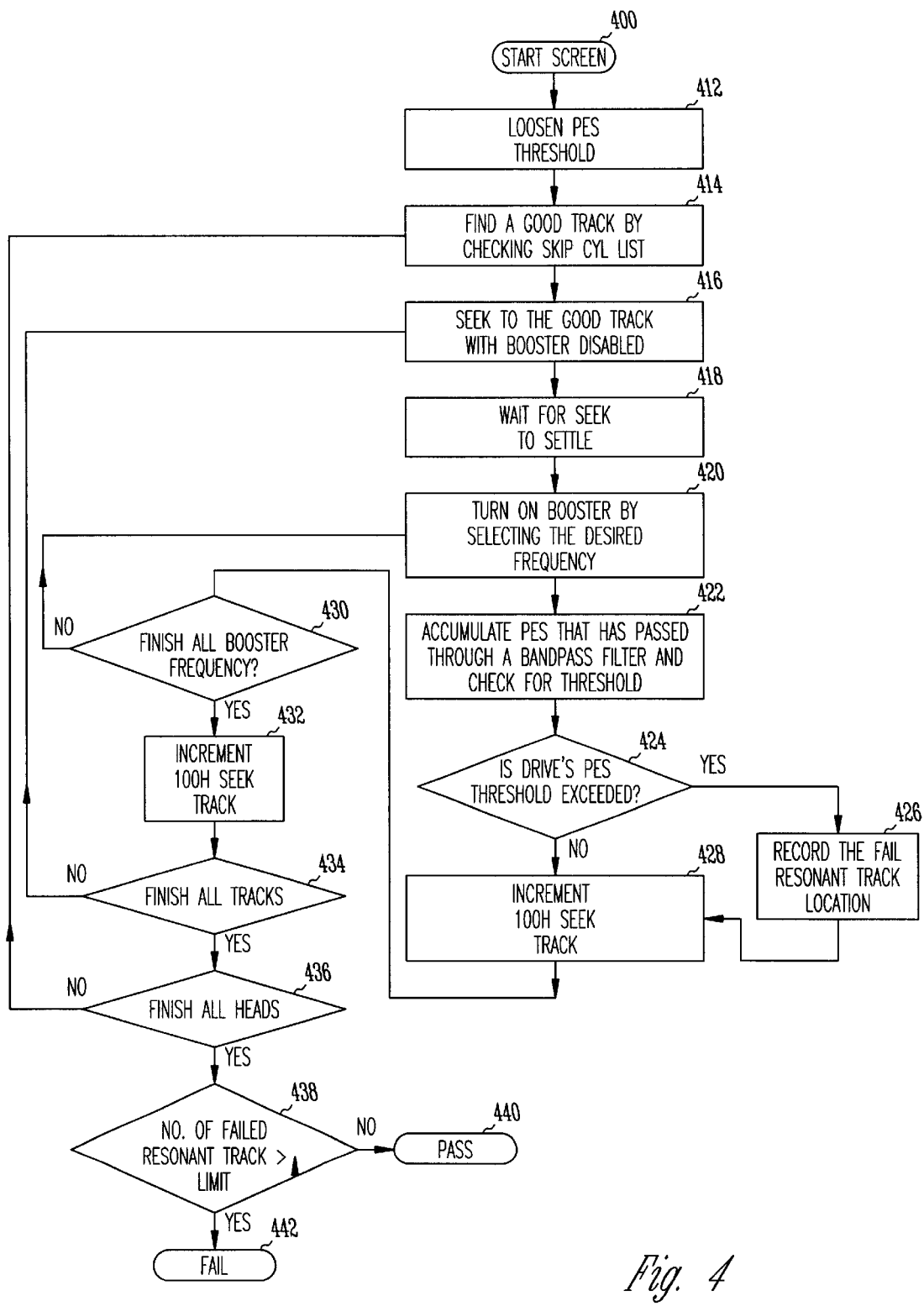
FIG. 4 is flow diagram of the process of using the instant invention in a disc drive.

FIG. 4 is a flow diagram of the process or resonant frequency test 400 which uses the instant invention on a particular disc drive 100. Now referring to FIG. 4, the specifics of the resonance test and use of the hardware shown in FIG. 3 will be discussed. The initial step 410 is to start the screen test. Starting the screen test includes approximately 10 minutes of warm-up seeking within the disc drive. This assures that the disc drive 100 will be at or near operating temperature when the resonance test begins. The next step 412 is to loosen the PES threshold. This is to prevent the disc drive 100 from entering a retry mode due to bad PES when the booster 310 is included in the servo control loop 300. The next step is to find a good track by checking the skip cylinder list within the disc drive, as depicted by step 414. The skip cylinder list is part of the mapping function to map actual sectors to logical block addresses. The skip cylinder list includes cylinders which are bad and will contain several tracks within the cylinder that are also labeled bad. The next step is to seek to a good track with the booster disabled, as depicted by step 416, and then to wait for the transducer to settle after the seek is complete, as depicted by step 418.

After the seek has been settled, the test station turns on or switches in the booster 310 and selects a desired frequency to boost, as depicted by step 420. The PES signal is accumulated after passing through the bandpass filter and checked against a predetermined threshold, as depicted by step 422. As mentioned previously, typically the PES data will be determined for one of several revolutions and averaged to come up with a value to be compared to the preselected threshold value. Once the monitor filtered PES signal 344 has been checked against the preselected threshold, a decision tree 424 determines if the disc drive's PES has exceeded the threshold. If the threshold has been exceeded, the disc drive records a failure at a particular resonant track location, as depicted by step 426. If the PES threshold is not exceeded, the disc drive will seek to each of the heads within the cylinder, as depicted by step 428.

For each particular head, the PES data after going through the bandpass filter is collected and compared to a selected threshold to determine if the disc drive 100 passes or fails this resonance screening test. Next a decision tree is encountered having a reference numeral 430 which asks if all the booster frequencies are finished. In other words, at a particular cylinder or track location, multiple frequencies may be tested. If all the frequencies are not tested, the booster is turned on and selects a new frequency which is shown by returning the arrow to step 420 and repeating the process between steps 420 and 430. If all the booster frequencies have been passed through the booster 310, then the disc drive seeks to a new track 432. After seeking to a new track, once again the process of turning on the booster and selecting various desired frequencies and testing for resonance is repeated. Next a decision tree asks if all the tracks have been tested or if you have finished all tracks, as depicted by decision tree 434. If not, then a seek to another good track with the booster disabled is performed, as depicted by an arrow returning to step 416 in the process. If all the tracks that are to be tested, have been tested, then all the tracks are finished and a yes from decision box 434 leads to another decision box 436 which asks if all the heads within the track have been tested. If not, then you find a good track by checking the skip cylinder list, as depicted by an arrow returning to step 414 in the process. A skip cylinder list contained all the bad track entries which needed to be skipped. If the track that has been selected does not belong to any entry from the skip cylinder list, then it will be considered as a good track. If all the heads are finished, then the disc drive looks at the number of failed resonant tracks to determine if they are over a limit, as depicted by decision box 438. If it is not over the limit, then the disc drive passes, as depicted by end 440. If the number of resonant tracks exceeds a limit, then the entire disc drive fails, as depicted by end 442 in FIG. 4.

Figure 5:
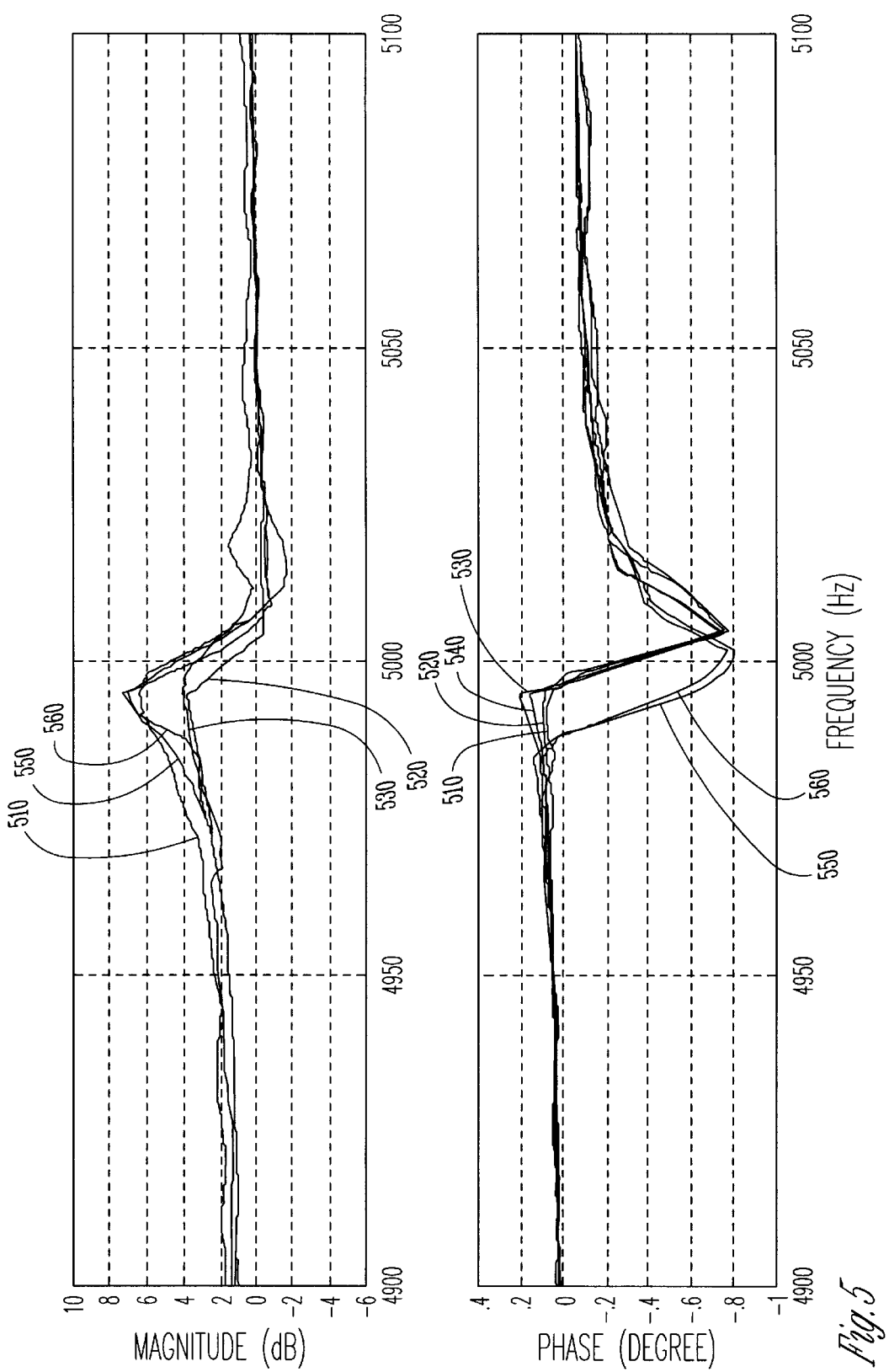
FIG. 5 is a plot showing the measured frequency response of different booster with varying magnitudes at the same center frequency.

FIG. 5 is a plot showing the measured frequency response of different booster frequency values 510, 520, 530, 540, 550, 560 with varying magnitudes at the same center frequency. The magnitude of the booster gain is tuned to a small value in this particular invention, which is approximately 5.0 dB. It will boost the open loop gain of the servo system about 5 dB more at the selected frequency. The drive will become unstable and can resonate easily if the open loop frequency response has a gain magnitude above zero dB at the particular frequency. If the drive has a big margin, it will not hit zero dB even though the booster has been used to boost up the gain value. However those drive that has little margin will start to resonate when the boostered gain has a magnitude more that zero dB.

Figure 6:
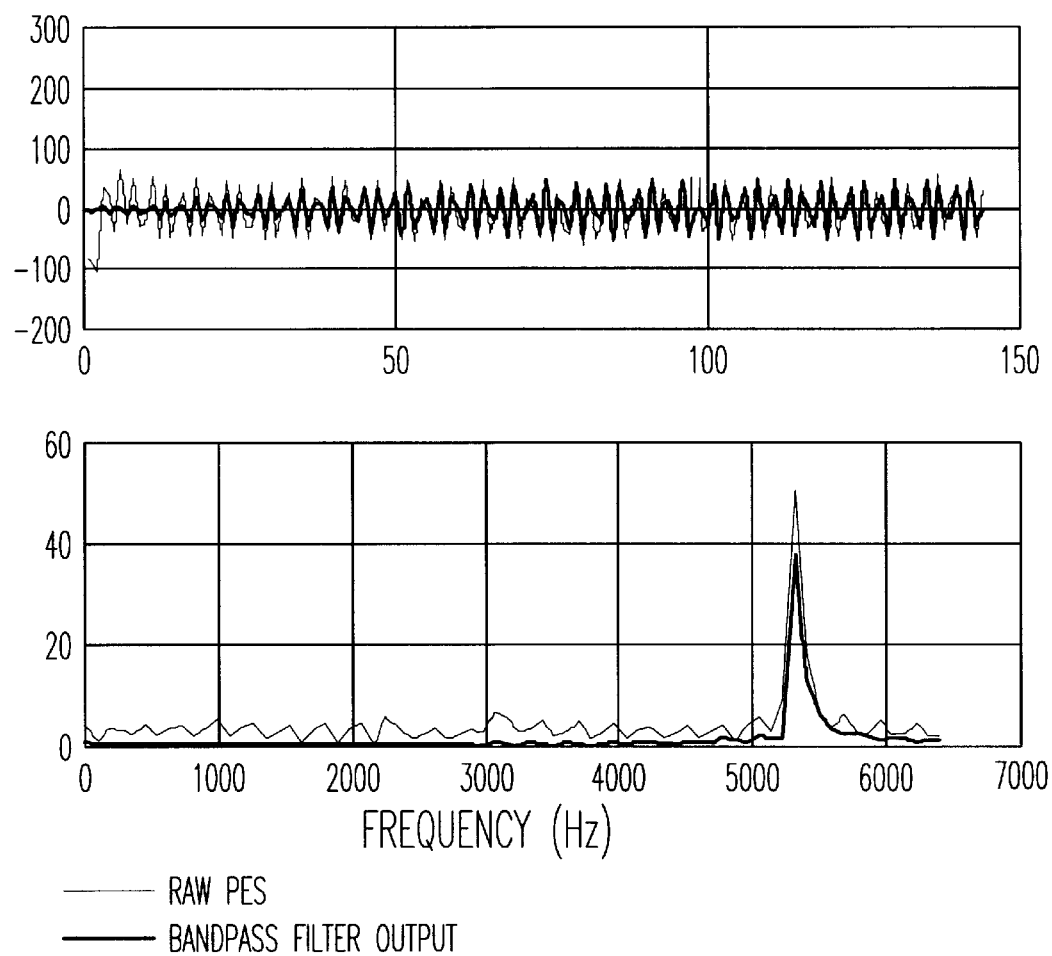
FIG. 6 is a graph showing raw PES and the output of the bandpass filter.

FIG. 6 is a graph showing raw position error signal and the output of the bandpass filter 310. A FFT operation has been performed on the position error signal after going through the bandpass filter. From FIG. 6, a high magnitude of the frequency spectrum of the position error signal at the resonance frequency is observed.

The booster behaves like a reverse notch filter. As we know, a second order digital IIR notch filter can be implemented in the form of:

$$\frac{Y(z)}{X(z)} = H(z) = \frac{B_0 + B_1 z^{-1} + B_2 z^{-2}}{1 + A_1 z^{-1} + A_2 z^{-2}}$$

The coefficients A and B can be determined by defining the passband, stopband and the notch center frequency using butterworth approximation techniques.

By swapping the numerator and denominator, we will have the transfer function of a digital booster as follows:

$$\frac{Y(z)}{X(z)} = H(z) = \frac{D_0 + D_1 z^{-1} + D_2 z^{-2}}{1 + C_1 z^{-1} + C_2 z^{-2}}$$

$C_1 = B_0$
$C_2 = B_1$
$C_3 = B_2$
$D_0 = A_0$
$D_1 = A_1$
$D_2 = A_2$

X is the input of the booster, while Y is output of the booster. This frequency domain equation can be expressed as a time domain difference equation as:

$$Y(k) = -C_1 Y(k-1) - C_2 Y(k-2) + D_0 X(k) + D_1 X(k-1) + D_2 X(k-2)$$

Advantageously, the inventive method and apparatus quickly screens disc drives for various frequencies, including frequency around a calculated frequency. The method and apparatus will also determine resonant frequencies for different situations, such as when a disc drive is at an operating temperature or when the mechanical components cause a shift in the frequency. The screening test indicates the amount of gain margin for the resonance frequencies found. The method and apparatus is quick and can be easily incorporated into the current manufacturing and testing process.

Figure 7:
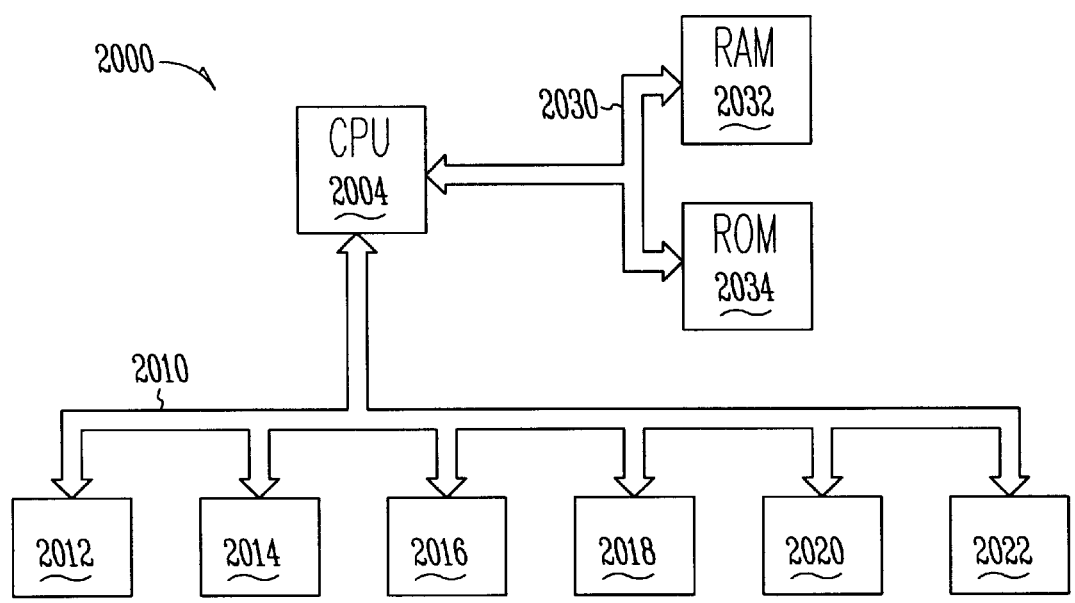
FIG. 7 is a schematic view of a computer system.

FIG. 7 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2000 includes a disc drive device which includes the ramp described above. The information handling system 2000 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Conclusion

A disc drive 100 includes a base 112 and a disc 134 rotatably attached to the base 112. The disc drive 100 also includes an actuator assembly 120 rotatably attached to said base 112 and a device for moving the actuator assembly. The actuator assembly 120 includes an actuator arm 123 and a transducer head 150 in a transducing relationship with respect to the disc 134. The transducer 150 is attached to the actuator arm 126. A method 400 for screening disc drives 100 for resonant frequencies associated with the actuator arm includes the steps of following a track 134 within the disc drive 100, and selectively boosting the servo control signal 420. The method further includes a step of monitoring a position error signal 422 from a transducer 150 attached to an actuator arm 123 of a disc drive 100. The position error signal 380 is monitored by filtering the position error signal 380 using a bandpass filter 340. Boosting the servo control loop 300 includes tuning the magnitude of the booster signal gain. In one embodiment, the magnitude of the booster gain is tuned to approximately 5 dB. Monitoring includes inputting the position error signal 380 to a bandpass filter 340, and checking the output 344 of the bandpass filter 340 for indications of frequency resonance having a value within a selected range of frequency values 422. The selected range of frequency values are near a calculated value for resonant frequency associated with the actuator assembly. The selected range of frequency values may also include shifts from the calculated value for resonant frequency corresponding to a shift in the resonant frequency of the actuator assembly due to thermal effects. The selected range of frequency values may also include shifts from the calculated value for resonant frequency corresponding to a shift in the resonant frequency of the actuator assembly 120 due to mechanical differences in the parts making up the actuator arm assembly of the disc drive. If resonant frequencies are found within the selected range, the disc drive is rejected 442.

A disc drive device 100 includes a base 112, a disc 134 rotatably attached to the base 112, an actuator arm 123 for carrying a transducer head 150 in a transducing relation with respect to the disc 134, and a disc drive controller 220, coupled to the actuator arm 134. The disc drive controller further includes a servo controller 220, coupled to the actuator arm 134. The servo controller 220 monitors a position error signal 380 in order to follow a track on the disc drive 100. A band pass filter 340 is used to monitor the position error signal 380 for resonant frequencies in the actuator arm. The bandpass filter monitors the position error signal 380 for resonant frequencies within a selected range of resonant frequencies. The disc drive further includes a position error signal switch 342 associated with the position error signal 380. The position error signal switch 342 is for inputting the position error signal to the bandpass filter 340. The disc drive device also includes a booster signal generator 340 which can be added to the servo control signal. A switch 312 which can be enabled to add the booster signal to the servo control signal. The switch 312 can also be termed a booster signal. In one embodiment, the booster signal switch 312 and the position error signal switch 342 add the booster signal and the bandpass filter to the servo control loop substantially simultaneously.

Most generally, an apparatus for testing a disc drive includes a servo control loop 300 and a device for altering the control signal 310 and monitoring the feedback signal of the servo control loop 340. Alternatively, a disc drive includes a base 112, an actuator arm 120 rotatably attached to the base, at least one disc 134 rotatably attached to the base 112, where the actuator arm carries a transducer head 150 in a transducing relation with respect to the disc 134, and a device for screening the disc drive for selected resonant frequencies 340.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of screening a disc drive for resonant frequencies associated with an actuator arm comprising steps of:
  (a) following a track within the disc drive;
  (b) selectively boosting a servo control signal and
  (c) monitoring a position error signal from a transducer attached to the actuator arm of the disc drive, comprising:

(c)(i) inputting the position error signal to a bandpass filter; and (c)(ii) checking an output of the bandpass filter for indications of frequency resonance having a value within a selected range of frequency values.

2. The method of claim 1, wherein the boosting step (b) includes tuning a magnitude of the booster signal gain.

3. The method of claim 2 wherein the magnitude of the booster gain is tuned to approximately 5 dB.

4. The method of claim 1, wherein the selected range of frequency values are near a calculated value for resonant frequency associated with the actuator arm.

5. The method of claim 1, wherein the selected range of frequency values include shifts from the calculated value for resonant frequency corresponding to a shift in the resonant frequency of the actuator arm due to thermal effects.

6. The method of claim 1, wherein the selected range of frequency values include shifts from the calculated value for resonant frequency corresponding to a shift in the resonant frequency of the actuator arm due to mechanical differences in the parts making up an actuator arm assembly of the disc drive.

7. The method of claim 1 further comprising a step of rejecting the disc drive if resonant frequencies are found within the selected range.

8. A disc drive device, comprising:

a base;

a disc rotatably attached to the base;

an actuator arm for carrying a transducer head in a transducing relation with respect to the disc;

a disc drive controller, coupled to the actuator arm, the disc drive controller further including a servo controller, coupled to the actuator arm, the servo controller monitoring a position error signal in order to follow a track on the disc drive;

a band pass filter for monitoring the position error signal for resonant frequencies in the actuator arm, and a position error signal switch associated with the position error signal for inputting the position error signal to the bandpass filter.

9. The disc drive of claim 8, wherein the bandpass filter monitors the position error signal for resonant frequencies within a selected range of resonant frequencies.

10. The disc drive of claim 8 further comprising a booster signal generator which can be added to a servo control signal.

11. The disc drive of claim 8 further comprising:

a booster signal generator associated with the servo control signal; and a booster signal switch which is selectively enabled to add the booster signal to the servo control signal.

12. The disc drive of claim 11 wherein the booster signal switch and the position error signal switch add the booster signal and the bandpass filter to the servo control loop substantially simultaneously.

* * * * *